United States Patent
Ahn (10) Patent No.: US 9,221,451 B2
(45) Date of Patent: Dec. 29, 2015

(54) SYSTEMS AND METHODS FOR INCREASING FUEL EFFICIENCY

(75) Inventor: Samuel S. Ahn, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 84 days.

(21) Appl. No.: 13/474,416

(22) Filed: May 17, 2012

(65) Prior Publication Data

US 2013/0311048 A1    Nov. 21, 2013

(51) Int. Cl.
| | | |
|---|---|---|
| *B60W 10/00* | (2006.01) | |
| *B60W 10/02* | (2006.01) | |
| *B60W 10/06* | (2006.01) | |
| *B60W 10/30* | (2006.01) | |
| *B60W 30/188* | (2012.01) | |

(52) U.S. Cl.
CPC ............. *B60W 10/023* (2013.01); *B60W 10/06* (2013.01); *B60W 10/30* (2013.01); *B60W 30/1886* (2013.01); *B60Y 2300/432* (2013.01); *B60Y 2300/46* (2013.01); *B60Y 2400/302* (2013.01); *B60Y 2400/88* (2013.01)

(58) Field of Classification Search
CPC ............ B60G 17/0195; B60R 16/0315; B60T 8/1755; B60W 10/06; B60W 10/20
USPC ................... 180/65.23, 65.245, 62.27, 65.31; 388/822; 477/169, 182; 701/112, 113, 701/22, 36, 54, 58, 2, 48; 74/473.1
See application file for complete search history.

(56) References Cited

U.S. PATENT DOCUMENTS

| | | | |
|---|---|---|---|
| 5,271,368 A | 12/1993 | Fujii et al. | |
| 5,490,815 A | 2/1996 | Kato et al. | |
| 5,626,536 A * | 5/1997 | Kono et al. | .................... 477/181 |
| 5,667,458 A * | 9/1997 | Narita et al. | ................... 477/169 |
| 5,667,548 A * | 9/1997 | Graule et al. | .................... 264/86 |
| 5,803,868 A | 9/1998 | Kono et al. | |
| 5,928,111 A | 7/1999 | Sakakibara et al. | |
| 6,067,489 A * | 5/2000 | Letang et al. | .................... 701/36 |
| 6,254,548 B1 * | 7/2001 | Ishikawa et al. | .............. 600/549 |
| 6,344,016 B1 | 2/2002 | Eguchi | |
| 6,668,224 B2 | 12/2003 | Kawai et al. | |
| 6,691,522 B1 | 2/2004 | Kojima | |
| 6,773,372 B2 | 8/2004 | Matsubara et al. | |
| 6,849,029 B2 | 2/2005 | Loeffler | |
| 6,860,833 B2 | 3/2005 | Ayabe | |
| 6,979,280 B2 | 12/2005 | Oshima et al. | |

(Continued)

FOREIGN PATENT DOCUMENTS

| | | |
|---|---|---|
| JP | 2000272381 | 10/2000 |
| JP | 2002248935 | 9/2002 |
| JP | 2005119387 | 5/2005 |

*Primary Examiner* — Helal A Algahaim
*Assistant Examiner* — Jelani Smith
(74) *Attorney, Agent, or Firm* — Snell & Wilmer LLP (57) ABSTRACT

The vehicle described herein employs an electronic control unit ("ECU") and/or accessory control module configured to improve actual fuel, economy. The ECU and/or the accessory control module monitors vehicle operating conditions and reduces load from an accessory when the vehicle achieves predetermined operating conditions. The ECU and/or the accessory control module is also configured to engage a fuel cut and a torque converter lock up condition. The lock up condition causes the wheels to drive the motor to avoid engine stall. At a predetermined low level, the ECU and/or the accessory control module can re-engage the accessory and fuel supply and disengage the lock up condition.

17 Claims, 4 Drawing Sheets

(56) References Cited

U.S. PATENT DOCUMENTS

| | | |
|---|---|---|
| 6,994,654 B2 | 2/2006 | Sakaguchi et al. |
| 7,238,142 B2 | 7/2007 | Kurogo et al. |
| 7,306,541 B2 | 12/2007 | Ogawa |
| 2002/0179348 A1* | 12/2002 | Tamai et al. ............ 180/65.2 |
| 2003/0033068 A1* | 2/2003 | Kawai et al. .............. 701/54 |
| 2004/0249534 A1* | 12/2004 | Yamada et al. ............ 701/36 |
| 2007/0102208 A1* | 5/2007 | Okuda et al. ............ 180/65.3 |
| 2009/0043465 A1* | 2/2009 | Tomita .................... 701/51 |
| 2010/0038158 A1* | 2/2010 | Whitney et al. ........ 180/65.265 |
| 2010/0145584 A1 | 6/2010 | Kojima |
| 2010/0311543 A1 | 12/2010 | Chang et al. |
| 2011/0077847 A1* | 3/2011 | Barr et al. ................ 701/113 |
| 2011/0174559 A1* | 7/2011 | Saito et al. ............ 180/65.27 |
| 2011/0246005 A1* | 10/2011 | King et al. ................ 701/22 |
| 2012/0234123 A1* | 9/2012 | Whitney et al. .......... 74/473.1 |
| 2013/0110383 A1* | 5/2013 | McDonald ................ 701/113 |

* cited by examiner

SYSTEMS AND METHODS FOR INCREASING FUEL EFFICIENCY

BACKGROUND

1. Field

The present invention relates to systems and methods for increasing fuel economy by reducing accessory load. More specifically, the present invention relates to managing the accessory load in response to a vehicle coast condition by reducing fuel consumption, reducing deceleration emissions, and preventing engine stall.

2. Description of the Related Art

Vehicles have traditionally been advertised and sold with a label fuel economy. This label fuel economy is typically published with materials for new vehicles and is often displayed on the "sticker" with the make and model of the vehicle, the price of the vehicle, and other relevant information. In the context of an automobile, the label fuel economy is established based on a fuel economy test that is standard in the automobile industry.

This label fuel economy is typically not reflective of the fuel economy a driver will experience when operating a vehicle in real world driving conditions (e.g., in city driving and/or stop and go driving), because the fuel economy test does not accurately replicate accessory loads on the engine and real word driving conditions. Typically, the actual fuel economy of the vehicle is lower than the label fuel economy, which is undesirable.

Thus, there is a need for systems and methods that that are capable of improving fuel economy of a vehicle in real world driving conditions so that the actual fuel economy is more consistent with the label fuel economy.

SUMMARY

In various exemplary embodiments, a vehicle comprises a body, a chassis, a wheel, an engine, an accessory, an accelerator, and an electronic control unit. The chassis couples to the body. The wheel rotatably couples to the chassis. The engine provides power to the wheel and drives the wheel in response to receiving fuel. The accessory operatively couples to and derives power from the engine. The accelerator communicates driver inputs to the engine. The electronic control unit monitors the plurality of operating ranges of the engine. The electronic control unit is also configured to disengage the operation of the accessory to interrupt power derivation from the engine in response to the engine operating within a predetermined range.

In various embodiments, the predetermined range corresponds to a coast condition. For example, the predetermined range may be defined by an engine speed of between approximately 1,000 rotations per minute of the engine and 400 rotations per minute of the engine.

In various embodiments, the accessory is an alternator. In other embodiments, the accessory is an air conditioning compressor.

In various embodiments, the vehicle may comprise a sensor. The sensor measures any suitable temperature or change in temperature, such as for example, the change to cabin temperature, the environmental temperature where the vehicle is operating, and/or the like. The electronic control unit may receive the environmental temperature from the sensor. In response to the engine operating within the predetermined range and the environmental temperature being above a temperature threshold, the electronic control unit does not disengage the operation of the accessory.

In various embodiments, the electronic control unit may interrupt the vehicle fuel supply to the engine in response to the engine operating within the predetermined range. The fuel supply and the accessory may be re-instated in response to the engine operating below the predetermined range to avoid engine stall. The fuel supply and the accessory may also be re-instated in response to receiving a driver input at the accelerator or the brake.

In various embodiments, a method for improving fuel economy of a vehicle by reducing engine load from an accessory is provided. The vehicle comprises an engine, an accessory (e.g., an air conditioning compressor, an alternator, and/or the like), a wheel, and an electronic control unit comprising accessory disengagement logic. The electronic control unit monitors the engine speed to detect a coast condition. In response to detecting the coast condition, the fuel supply is disengaged. The electronic control unit controls the derivation of power of the accessory from the engine, based on an operating parameter of the vehicle. The electronic control unit also monitors the coast down speed of the engine. When the coast down speed reaches a predetermined level, the electronic control unit re-engages the fuel supply. The electronic control unit also re-engages the accessory in response to re-engaging the fuel supply. In these embodiments, the predetermined level is an engine speed that is approximately 150 rpms to approximately 500 rpms above base idle speed when the lock up clutch is engaged or approximately 300 rpms to approximately 700 rpms above base idle speed when the vehicle is in neutral. The base idle speed is the resting idle speed of the vehicle when the engine is operating at a normal operating temperature with no accessories operating.

In various exemplary embodiments, the vehicle further comprises a temperature sensor configured to detect a temperature of an ambient environment in which the vehicle is operating or a vehicle interior temperature. In these embodiments, the temperature is the operating parameter. The temperature sensor is configured to communicate the temperature to the electronic control unit. The electronic control unit is configured to disengage the accessory in response to the temperature being below a predetermined level.

In these embodiments, the vehicle may further comprise a torque converter and a drive shaft. The torque converter is configured to lock-up the power train to cause the wheel to drive the engine in response to the coast condition.

In various embodiments, an automobile comprises a plurality of wheels, a drive shaft, an engine, a fuel source, an accessory (e.g., a compressor, an alternator, and/or the like), and an electronic control unit. The automobile further comprises a torque converter. The drive shaft operatively couples to at least one of the plurality of wheels. The torque converter comprises a lock up clutch that is configured to unify the drive shaft and engine to capture the kinetic energy of at least one of the plurality of wheels to drive the engine. The engine operatively couples to the drive shaft though the toque converter. The engine also conducts a drive force through the drive shaft to at least one of the plurality of wheels in response to the engine operating with a fuel supply. The fuel source stores and provides the fuel supply to the engine. The accessory operatively couples to and draws power from the engine. The electronic control unit communicates with the engine, the torque converter, the fuel source, and the accessory. The electronic control unit may disengage the fuel source and the accessory and engage the torque converter to cause at least one of the plurality of wheels to drive the engine in response to the engine achieving a coast condition.

In various embodiments, the automobile further comprises a battery. The battery is configured to receive a charge from the alternator when the alternator loads the engine. The alternator disengages the engine in response to the engine achieving a coast condition and the charge level of the battery is above a predetermined charge condition.

In these embodiments, the automobile may further comprise a sensor configured to measure and communicate an operating temperature to the electronic control unit. The electronic control unit disengages the compressor and the fuel supply to the engine in response to the engine achieving a coast condition and the operating temperature being below a selected level.

BRIEF DESCRIPTION OF THE DRAWINGS

The features, obstacles, and advantages of the present disclosure will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

In various exemplary embodiments, a vehicle may comprise and/or be equipped an accessory control module. The accessory control module monitors vehicle operating parameters. When the accessory control module detects a predetermined operating parameter, the accessory control module may disengage an accessory from the engine, thereby, reducing the load on the engine and improving overall vehicle fuel economy.

In various embodiments, the accessory control module may be any suitable hardware, software, and/or hardware-software system configured to improve fuel economy by reducing load on the engine during predetermined operating conditions. The accessory control module may comprise and/or operate on an existing electronic control unit ("ECU") or a dedicated ECU. The accessory control module may be configured to receive vehicle performance data from any vehicle component or sensor including, for example, the engine, a temperature sensor, an accessory, a fuel supply, and/or the like. The accessory control module may be installed at any suitable location in any vehicle. Moreover, the accessory control module may comprise or be configured to interface with various existing automobile components and/or systems, including for example, a vehicle air conditioning system, a torque converter, a vehicle fuel system, a vehicle electrical system, and/or the like.

Figure 1:
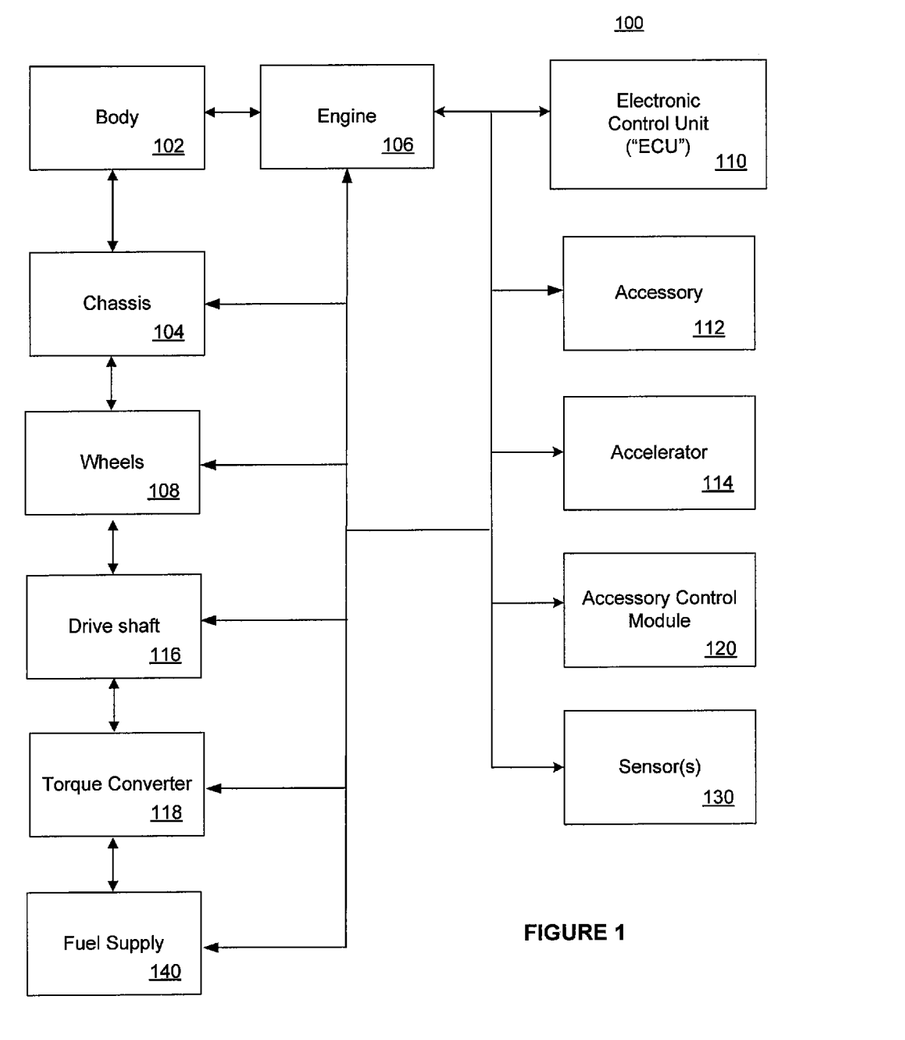
FIG. 1 is a block diagram of an automobile comprising an engine and a control unit comprising an accessory control module in accordance with various embodiments.

In various embodiments and with reference to FIG. 1, a vehicle 100 may be any suitable form of transportation. For example, the vehicle 100 may be an automobile, a motor cycle, a scooter, or any other suitable form of transportation. The vehicle 100 generally comprises a body 102, a chassis 104, an engine 106, one or more wheels 108, and/or an ECU 110. The vehicle 100 also comprises and/or is configured with an accessory 112, an accelerator 114, a drive shaft 116, a torque converter 118, an accessory control module 120, one or more sensors 130, and a fuel supply 140. In these embodiments, the body 102 mounts on and couples to the chassis 104. The fuel supply 140 (e.g., fuel tank) mounts to the chassis 104 and may be at least partially enclosed by the body 102. The chassis 104 rotatably couples to the wheels 108. The engine 106 mounts to and is supported by the chassis 104 and may be at least partially enclosed by the body 102. The drive shaft 116 and the torque converter 118 receive power from the engine 106 and conduct that power to one of more wheels 108. The accessory 112 couples to and derives or receives power from the engine 106.

In various embodiments, the accessory includes, for example, an air conditioning compressor, an alternator, and/or the like. The accelerator 114 provides inputs to the engine 106 and/or the ECU 110. The ECU 110 is in electronic communication (e.g., wired or wireless communication) with the engine 106 and is installed at any suitable location within the vehicle 100. The ECU 110 also comprises and/or is in electronic communication (e.g., wired or wireless) with the accessory control module 120. One or more sensors 130 may be installed at any suitable position(s) on the vehicle 100 and may electronically communicate with the ECU 110 and/or the accessory control module 120.

The engine 106 drives one of more of the wheels 108. More specifically, the engine 106 operatively couples to an automatic transmission comprising the torque converter 118. The transmission conducts the power received from the engine 106 to the drive shaft 116. The engine 106 may be any suitable motor configured to consume fuel and/or energy and output power such as, for example, an internal combustion engine, a hybrid internal combustion engine-electric motor, or any other suitable power generation system suitable to power the vehicle 100.

In various embodiments, the accessory 112 may be any component configured to draw power from the engine 106. The accessory 112 is in communication with the ECU 110. In this way, the ECU 110 controls the operation of the accessory 112 and is configured to turn the accessory 112 on or off. The accessory 112 may include one or more of an air conditioning compressor, an alternator, and/or the like. Typically, the accessory 112 operatively couples to and creates a load on the engine 106. This load causes the engine 106 to operate at a higher engine speed than it otherwise would if the load was not applied.

In various embodiments, the logic associated with the accessory control module 120 and/or the ECU 110 disengages an accessory to improve fuel efficiency and may be selectable by the user. For example, the vehicle 100 may include a selectable button, switch, or other suitable interface, that allows a user to engage and disengage the logic. In other embodiments, the vehicle 100 may include an "ECO mode" that is selectable by the user. The ECO mode may include the logic and other fuel saving technologies including, for example, a transmission shifting strategy, a fuel cut to one of more cylinders of the engine 106, restricted acceleration capabilities, and/or the like. As such the logic may be activated as part of a more comprehensive fuel economy improvement strategy.

In various embodiments, the vehicle 100 comprises an automatic transmission. The automatic transmission may use the torque converter 118 to smoothly transmit torque from the engine to the transmission. The torque converter 118 is equipped with a friction clutch disc ("lock-up clutch") that can lock together the input and output elements of the torque converter 118 to become one rotating element.

The ECU 110 monitors and commands engine functions both independent of and in response to a driver's input. When the driver is not pressing the accelerator 114 and the vehicle is coasting, the ECU 110 and/or the accessory control module 120 commands the torque converter 118 to lock up if other conditions are met (e.g., the transmission fluid temperature is greater than 30 degrees Celsius ("° C.") and the vehicle speed is above 10 kilometers per hour ("kph")).

When the load on the engine 106 from the accessory 112 is high (e.g., air conditioning compressor is active) the engine 106 must raise its idle speed in order to prevent a stall from occurring. When coasting to a stop, if the load is high, the torque converter 118 cannot remain locked up for as long a period, as if, the accessory load were low. The torque converter 118 must disengage at a higher engine speed and/or a vehicle speed for the fuel-cut to return and keep the higher idle speed to avoid a stall of the engine 106. Therefore, if the engine accessory load is high during a coast-down condition, the fuel-savings are not maximized and deceleration emissions are not minimized compared to when the engine accessory load is low.

As the vehicle 106 decelerates and approaches a lower speed (e.g., between approximately zero and approximately 35 kph) from a medium speed (e.g., between approximately 30 and approximately 55 kph), the ECU 110 and/or the accessory control module 120 commands the accessory 112 to become inactive. Reducing the load on the engine 106 allows the torque converter 118 to remain in lock-up and fuel-cut can continue until the minimum engine idle speed (e.g., rotations per minute ("rpm")) has been reached. In various embodiments, the minimum engine idle rpm is approximately 150 rpms to approximately 500 rpms above base idle speed when the lock up clutch is engaged. In various embodiments, the minimum engine idle rpm may be approximately 200 rpms to approximately 400 rpms above base idle speed when the lock up clutch is engaged. In various embodiments, the minimum engine idle rpm may be approximately 250 rpms to approximately 350 rpms above base idle speed when the lock up clutch is engaged. In various embodiments, minimum engine idle rpm is approximately 300 rpms to approximately 700 rpms above base idle speed when the vehicle is in neutral. In various other embodiments, minimum engine idle rpm is approximately 400 rpms to approximately 600 rpms above base idle speed when the vehicle is in neutral. In various other embodiments, minimum engine idle rpm is approximately 450 rpms to approximately 550 rpms above base idle speed when the vehicle is in neutral. The base idle speed is the resting idle speed of the vehicle when the engine is operating at a normal operating temperature with no accessories operating. When the engine 106 reaches the minimum engine idle speed, the ECU 110 and/or the accessory control module 120 re-engages the fuel supply 140 and the accessory 112, and commands the torque converter 118 to release the lock-up clutch.

The timing and vehicle speed at which the accessory 112 disengages may be affected by multiple factors such as, for example, the time required for the engine speed to stabilize after the load is cancelled, the power draw from each accessory load, the side-effects of canceling a particular load earlier than normally programmed, and/or other suitable factors.

As such, in various embodiments, the ECU 110 and/or the accessory control module 120 actively manages the disengagement/engagement timing of engine accessory loads in order to maximize the period of lock-up and fuel-cut during a coast-down condition of the vehicle 100. The control strategy creates increased fuel-economy and decreased deceleration emissions over normal usage of the vehicle 100, particularly, in drive cycles consisting of heavy stop and go driving, where there are greater opportunities for coast-down and lock-up.

Figure 2A:
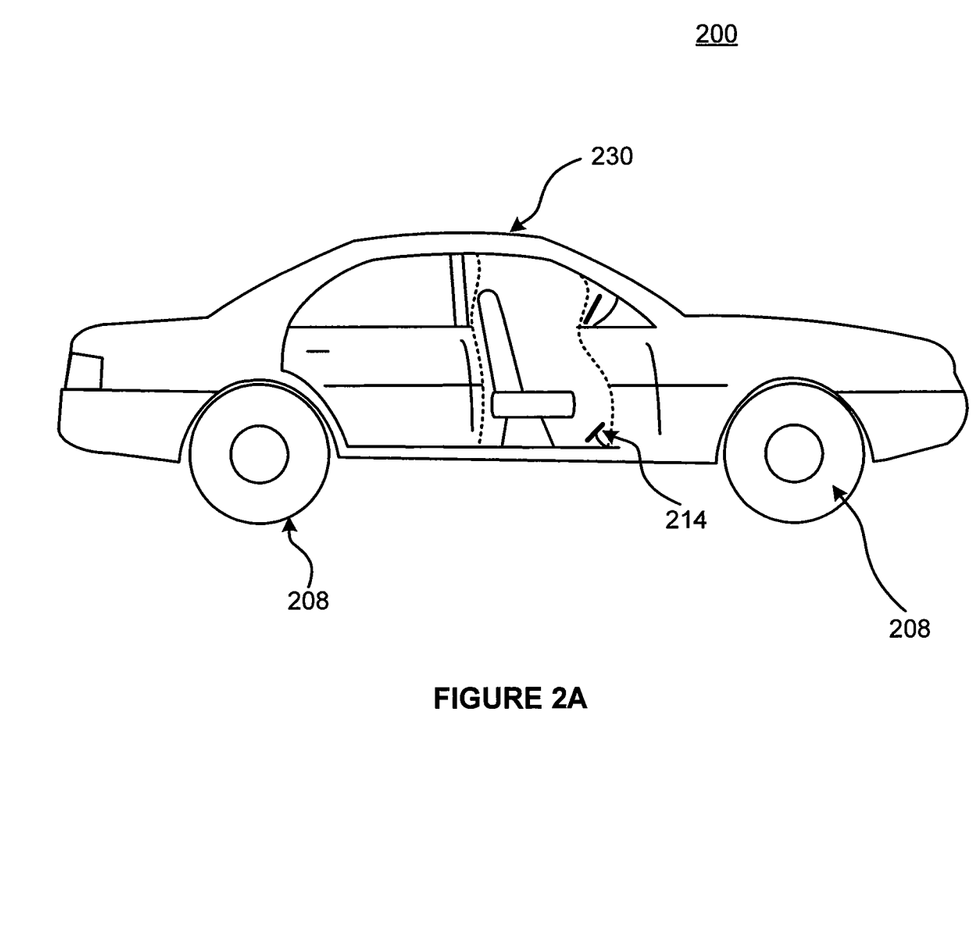
FIG. 2A illustrates a side view of an automobile in accordance with various embodiments.
Figure 2B:
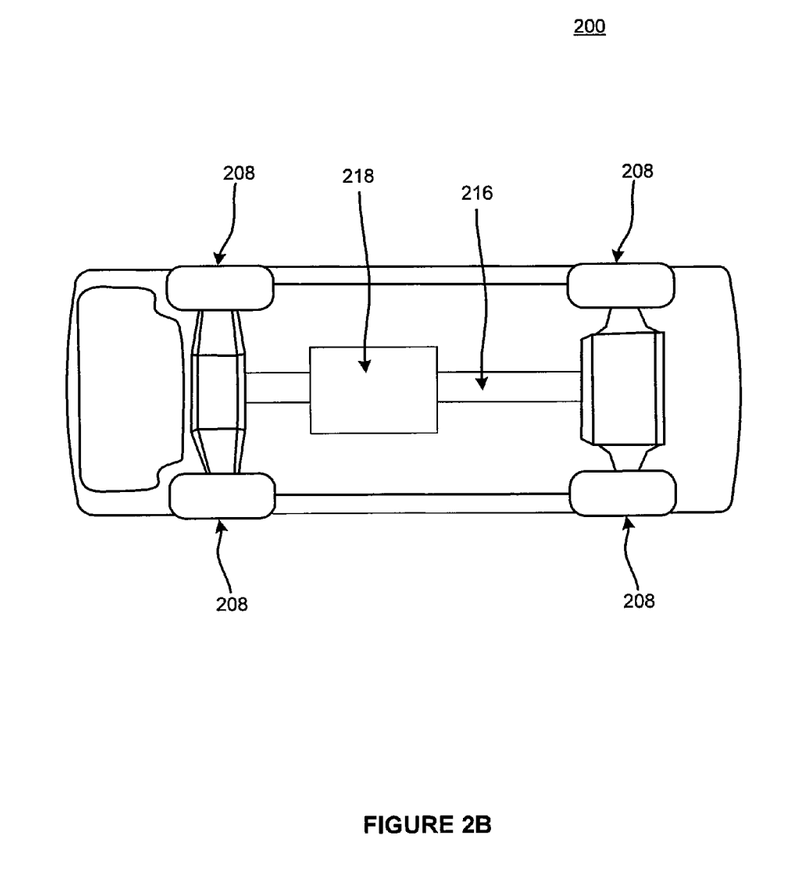
FIG. 2B illustrates a bottom view of an automobile in accordance with various embodiments.

In various embodiments, and with reference to FIG. 2A and FIG. 2B, the sensor 230 is installed on the vehicle 200 at any suitable location. The sensor 230 may be configured to monitor, measure, detect, and/or communicate a vehicle operating parameter or an environmental parameter. For example, the sensor 230 may be configured to monitor the ambient temperature of the environment or the interior of the vehicle 100.

As discussed above, the ECU may be configured to disengage or turn off certain engine accessories (e.g., the air conditioning compressor), in response to detecting a coast condition or a predetermined operating range of the engine and/or vehicle. The compressor may be turned off to reduce the load on the engine. The ECU may also command the torque converter 218 to lock-up, causing the kinetic energy of the wheel 208 to turn the drive shaft 216 and the engine to prevent a stall condition. This operation provides increased fuel efficiency, because the engine does not require fuel while being driven by the wheels before a potential stall condition.

However, in certain operating environments (e.g., during the summer in Phoenix, Ariz.), driver's may be willing to forgo the increase in efficiency that results from disengagement of the air conditioning compressor because of high temperatures. As such, the ECU and or the accessory control module may be configured with logic that does not prolong the extended lock up condition, when a detected temperature (e.g., the temperature of the environment or the temperature of the cabin) of the vehicle 200 is above a predetermined threshold. In one example, when the ambient temperature of the environment is above a temperature of approximately 32° C. to 37° C., the logic may continue the operation of the air conditioning compressor. In another example, when the cabin temperature deviates above a predetermined range (e.g., 2° C. to 7° C.) the logic may continue the operation of the air conditioning compressor.

In various embodiments, the sensor 230 may be configured to monitor a charge level (e.g., a current level or voltage level) of a battery of the vehicle 200. The sensor 230 may be configured to communicate the charge level to the ECU. Where the accessory is an alternator, the ECU may be configured to analyze the actual charge level of the battery against a predetermined charge level. The alternator may be configured with an engagement. The engagement may communicate with the ECU or other suitable control element. The engagement may be any suitable system for activating or disengaging the alternator including, for example, a mechanical engagement, an electrical engagement, a magnetic engagement, an electro-mechanical engagement, and/or the like. Where the actual charge level is above the predetermined charge level, the ECU and/or the accessory control module may disengage the engagement. This causes the accessory to disengage from the engine in response to the vehicle operating in a coast down condition and meeting the other requirements for accessory disengagement discussed above.

Figure 3:
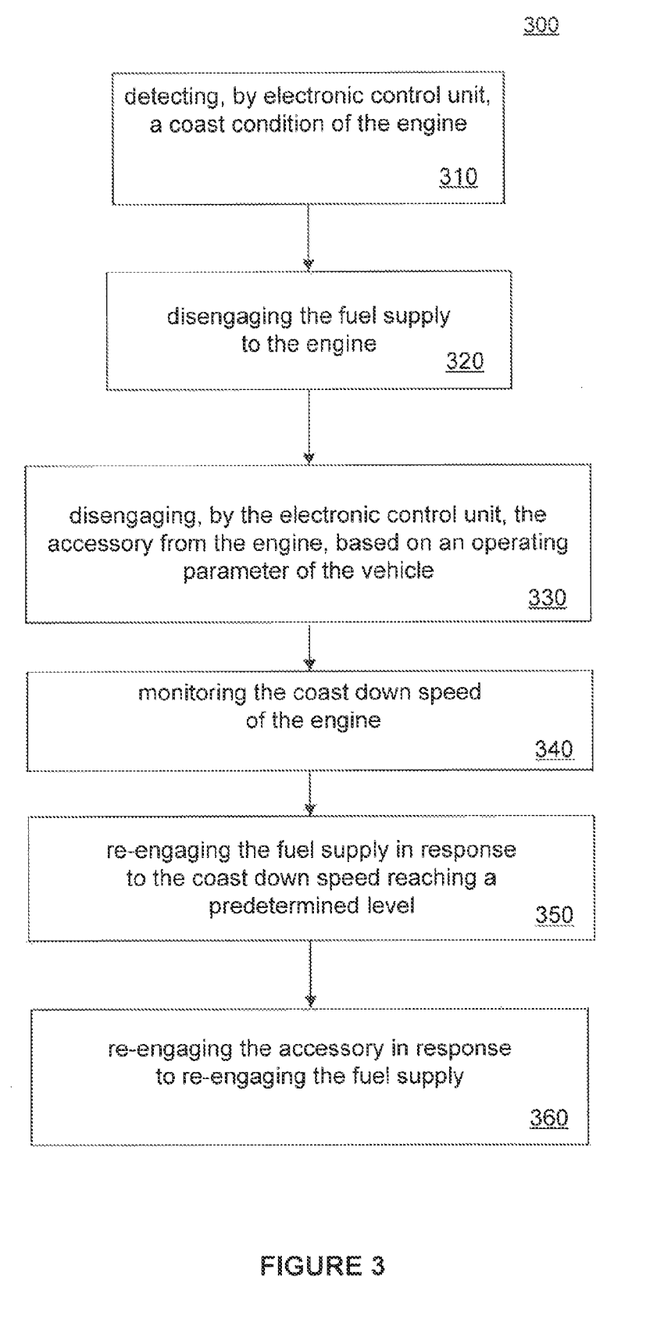
FIG. 3 is a block diagram of a control process executed by an electronic control unit and/or an accessory control module in accordance with various embodiments.

In various embodiments and with reference to FIG. 3, the ECU and/or accessory control module may be configured to perform a method to control and/or improve fuel economy and reduce declaration emissions by reducing accessory load on the engine, such as method 300. In these embodiments, the vehicle comprises an engine, an accessory, a wheel, and an electronic control unit comprising accessory disengagement logic. The ECU and/or the accessory control module detects a coast condition of the engine in block 310. The coast condition may be a predetermined range defined in the logic such as, for example, zero kph to 30 kph, in response to detecting the coast condition, the ECU and/or the accessory control module disengages the fuel supply to the engine in block 320. The ECU and/or the accessory control module also controls the engagement between the accessory and the engine, based on an operating parameter of the vehicle in block 330. In an embodiment, the ECU and/or the accessory control module may turn off the accessory. In another embodiment, the accessory may be configured with a clutch or other suitable mechanical, electronic, or electro-mechanical engagement mechanism that may be disconnected by the ECU and/or the accessory control module to remove the load of the accessory from the engine. The ECU and/or the accessory control module continues to monitor the coast down speed of the engine in block 340. In response to the coast down speed reaching a predetermined level, the ECU and/or the accessory control module re-engages the fuel supply in block 350. The ECU and/or the accessory control module also re-engages the accessory in response to re-engaging the fuel supply in block 360. As noted above, the ECU and/or the accessory control module may also consider other factors, including for example, the transmission temperature, the ambient operating temperature, the vehicle interior ambient temperature, the charge level of the battery, an input from the user, and/or the like. As such, the ECU and/or the accessory control module monitors and controls accessory load on the engine to improve fuel economy and reduce deceleration emissions, such that the actual fuel economy of the vehicle is more similar to the label fuel economy.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Thus, the automobile described herein employs an aerodynamic chassis control system to limit and/or minimize the affect of yaw and roll created by environmental and operating conditions on an automobile with minimal penalty to improve ride comfort and performance of the automobile.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A vehicle having wheels, comprising:
   an engine configured to provide power at an engine speed;
   a transmission having a transmission input speed and a transmission output speed for utilizing a first portion of the power provided by the engine to cause rotation of the wheels;
   a torque converter coupled between the engine and the transmission, and configured to operate in a normal operation mode or a lock-up mode during which the engine speed is substantially the same as the transmission input speed;
   an accessory operatively coupled to the engine and configured to utilize a second portion of the power provided by the engine;
   an accelerator pedal configured to detect an acceleration input;
   an input device configured to receive or detect a user input indicating a mode of operation of the vehicle including a fuel economy mode;
   at least one sensor configured to detect at least one of an environmental condition or a vehicle operating parameter; and
   an electronic control unit configured to set a current condition of the vehicle to a coast condition when the mode of operation of the vehicle is the fuel economy mode and the acceleration input indicates that the accelerator pedal is not depressed,
   wherein when or after the current condition is the coast condition, the electronic control unit is further configured to:

determine whether the torque converter should operate in the lock-up mode based on the at least one of the environmental condition or the vehicle operating parameter, and when the torque converter is operating in the lock-up mode, prevent the engine from providing power to the accessory based on at least the engine speed.

2. The vehicle of claim 1, wherein when the torque converter is operating in the lock-up mode and the current condition is the coast condition, the electronic control unit is configured to prevent the engine from providing power to the accessory when the engine speed is between approximately 400 rotations per minute of the engine and 1,000 rotations per minute of the engine.

3. The vehicle of claim 1, wherein the accessory is an alternator.

4. The vehicle of claim 1, wherein the accessory is an air conditioning compressor.

5. The vehicle of claim 4, wherein the at least one sensor includes a temperature sensor configured to measure an ambient temperature external to the vehicle, and wherein the environmental condition is based on the ambient temperature.

6. The vehicle of claim 5, wherein the electronic control unit is further configured to receive the ambient temperature from the temperature sensor, and wherein the electronic control unit does not prevent the engine from providing power to the accessory when the ambient temperature is equal to or greater than a temperature threshold.

7. The vehicle of claim 1, wherein when the torque converter is operating in the lock-up mode and the current condition is the coast condition, the electronic control unit is configured to prevent a fuel supply from flowing to the engine based on at least the engine speed.

8. The vehicle of claim 7, wherein the electronic control unit is configured to re-allow the fuel supply to flow to the engine and re-allow the engine to provide power to the accessory based on at least one of the second portion of the power provided by the engine, the engine speed, or a time period for the engine speed to stabilize after the engine is prevented from providing power to the accessory.

9. A method for enhancing energy efficiency of a vehicle having wheels and an engine configured to provide power at an engine speed, the method comprising:

providing a transmission having a transmission input speed and a transmission output speed for utilizing a first portion of the power provided by the engine to cause rotation of the wheels;

providing a torque converter coupled between the engine and the transmission, and configured to operate in a normal operation mode or a lock-up mode during which the engine speed is substantially the same as the transmission input speed;

providing an accessory configured to utilize a second portion of the power provided by the engine;

detecting, using an accelerator pedal, an acceleration input;

detecting, using an input device, a user input indicating a mode of operation of the vehicle including a fuel economy mode;

detecting, using at least one sensor, at least one of an environmental condition or a vehicle operating parameter;

setting, using an electronic control unit, a current condition of the vehicle to a coast condition when the mode of operation of the vehicle is the fuel economy mode and the acceleration input indicates that the accelerator pedal is not depressed;

determining, using the electronic control unit, whether the torque converter should operate in the lock-up mode based on the at least one of the environmental condition or the vehicle operating parameter, the determination being performed when or after the current condition is the coast condition; and preventing, using the electronic control unit, the engine from power to the accessory based on at least one of the second portion of the power provided by the engine, the engine speed, or a time period for the engine speed to stabilize after the engine is prevented from providing power to the accessory.

10. The method of claim 9, wherein the step of preventing, using the electronic control unit, the engine from providing power to the accessory is performed when the torque converter is operating in the lock-up mode, the current condition is the coast condition, and the engine speed is within the range of approximately 250 rpms to approximately 350 rpms above a base idle speed of the engine.

11. The method of claim 9, wherein the accessory is an air conditioning compressor.

12. The method of claim 9, further comprising detecting, by a temperature sensor, a temperature external to the vehicle, wherein the environmental condition is based on the detected temperature.

13. The method of claim 12, wherein the temperature sensor is configured to communicate the temperature to the electronic control unit, and wherein when the torque converter is operating in the lock-up mode and the current condition is the coast condition, the electronic control unit is configured to prevent the engine from providing power to the accessory in response to the temperature being below a predetermined level.

14. An automobile, comprising:

a plurality of wheels;

an engine configured to provide power at an engine speed;

a transmission having a transmission input speed and a transmission output speed for utilizing a first portion of the power provided by the engine to cause rotation of the plurality of wheels;

a torque converter coupled between the engine and the transmission, and configured to operate in a normal operation mode or a lock-up mode during which the engine speed is substantially the same as the transmission input speed;

an accessory operatively coupled to the engine and configured to utilize a second portion of the power provided by the engine;

an accelerator pedal configured to detect an acceleration input;

an input device configured to receive or detect a user input indicating a mode of operation of the automobile including a fuel economy mode;

at least one sensor configured to detect at least one of an environmental condition or an automobile operating parameter; and an electronic control unit in communication with the engine, the torque converter, the accessory, and the input device and configured to:

determine whether the torque converter should operate in the lock-up mode based on the at least one of the environmental condition or the automobile operating parameter, and when the torque converter is operating in the lock-up mode, prevent the engine from providing power to the accessory based on at least one of the second portion of the power provided by the engine, the engine speed, or a time period for the engine speed to stabilize after the engine is prevented from providing power to the accessory.

15. The automobile of claim 14, wherein the accessory is at least one of a compressor or an alternator.

16. The automobile of claim 15, further comprising a battery configured to receive a charge from the alternator and wherein the electronic control unit is configured to prevent the engine from providing power to the alternator when or after the battery has a state of charge that is equal to or greater than a state of charge threshold value.

17. The automobile of claim 15, further comprising a sensor configured to measure and communicate an operating temperature of a device or a unit of the automobile to the electronic control unit, and wherein the electronic control unit is configured to prevent the engine from providing power to the compressor based on the operating temperature.

* * * * *